United States Patent [19]
Yu et al.

[11] Patent Number: 5,849,047
[45] Date of Patent: Dec. 15, 1998

[54] POLYMERIC DISPERSANTS AND METHOD OF MAKING SAME

[75] Inventors: Daniel Y. F. Yu, Columbus, Ind.; Carl A. Mike, Chesterfield, Va.

[73] Assignee: Ethyl Corporation, Richmond, Va.

[21] Appl. No.: 742,334

[22] Filed: Nov. 1, 1996

[51] Int. Cl.$^6$ .......................... C10L 1/18; C10M 145/00; C08F 34/00; C08F 26/04

[52] U.S. Cl. .............................. 44/346; 44/331; 508/221; 508/292; 525/327.6; 525/328.2; 525/337; 525/340; 525/343; 526/271; 526/312

[58] Field of Search .............................. 525/327.6, 328.2, 525/328.3, 337, 340, 343; 526/271, 312; 44/346, 331; 508/235, 288, 221, 292

[56] References Cited

U.S. PATENT DOCUMENTS

| | | | |
|---|---|---|---|
| 4,089,902 | 5/1978 | Morita | 564/388 |
| 4,234,435 | 11/1980 | Meinhardt et al. | 508/192 |
| 4,873,009 | 10/1989 | Anderson | 508/192 |
| 4,908,145 | 3/1990 | Fenoglio | 508/232 |
| 5,080,815 | 1/1992 | Fenoglio et al. | 508/190 |
| 5,112,507 | 5/1992 | Harrison | 508/192 |
| 5,298,289 | 3/1994 | Lindert et al. | 427/388.4 |

FOREIGN PATENT DOCUMENTS

| | | |
|---|---|---|
| 0 657 475 A1 | 12/1994 | European Pat. Off. . |
| WO 95/07944 | of 0000 | WIPO . |

OTHER PUBLICATIONS

The Merck Index, Tenth Edition, (Merck & Co., Inc., Rahway, NJ, 1983) pp. 66, entry 444, Month unavailable.

J. H. Hodgkin et al., "Cyclopolymerization. VIII. The Synthesis of Allylamino Monomers by the Mannich Reaction and Their Polymerizaion", J. Macromol. Sci.–Chem., A10(5), PP893–922 (1976), Month unavailable.

J. H. Hodgkin, "Cyclopolymerization. XIII. Cyclopolymerization of Diallylaminomethylphenols", J. Macromol. Sci.–chem., A11(5), pp. 937–956 (1977), Month unavailable.

*Primary Examiner*—Richard D. Lovering
*Assistant Examiner*—Daniel S. Metzmaier
*Attorney, Agent, or Firm*—Dennis H. Rainear; Thomas Hamilton

[57] ABSTRACT

This invention concerns the utilization of polymeric compounds generated from Mannich base macromonomers as lubricant oil and fuel additives or intermediates to such additives. Requisite macromonomers are generated via Mannich reaction of high molecular weight alkyl phenols and unsaturated amines. Homopolymers of the Mannich base macromonomers or copolymers with activated unsaturated monomers, such as maleic anhydride, are of particular interest as crankcase dispersants. For example, functionalization of Mannich base macromonomer/maleic anhydride copolymers with amines affords effective crankcase dispersants. Such polymeric dispersants are designed to impart superior sludge protection and improved viscometrics to lubricant oils.

12 Claims, No Drawings

5,849,047

POLYMERIC DISPERSANTS AND METHOD OF MAKING SAME

TECHNICAL FIELD

The present invention includes Mannich base macromonomers produced from alkyl-substituted phenols, aldehydes, and mono- or di-unsaturated amines as lubricant and fuel additives or intermediates. Homopolymers of the Mannich base macromonomers or copolymers with activated unsaturated monomers, such as maleic anhydride, are of particular interest as crankcase dispersants. For example, functionalization of Mannich base macromonomer/maleic anhydride copolymers with amines affords effective crankcase dispersants. Such polymeric dispersants impart superior sludge protection and improved viscometrics to lubricant oils.

BACKGROUND

Mannich base dispersants are a class of commercial crankcase dispersants (e.g., HiTEC® 7049). These compounds are typically produced by reacting alkyl-substituted phenols with aldehydes and amines, such as is described in U.S. Pat. Nos. 3,736,535 and 3,736,357.

J. H. Hodgkin et al. utilized diallylaminomethyl phenols, generated via Mannich reaction of lower alkyl-substituted phenols and diallylamine, to generate water soluble polymers (see J. Macromol. Sci., Chem. (1977), A11(5), pp. 937–956 and J. Macromol. Sci., Chem. (1976), A10(5), pp. 887–916).

Recent patent disclosures exemplify the utility of polymeric dispersants for improving lubricant oil compositions. These inventions focus upon the free radical polymerization of polybutenes and unsaturated acidic reactants. U.S. Pat. No. 5,112,507 and European Patent Application EP 0 657 475 A1 detail the use of high molecular weight vinylidene-containing polymers and unsaturated acidic reactants as useful lubricant and fuel additives. Patent Cooperation Treaty Application WO 95/07944 details the use of terpolymers of high molecular weight vinylidene-containing polymers, low molecular weight monoethylenically unsaturated compounds, and unsaturated acidic reactants.

Polybutenylsuccinic anhydride (PBSA) serves as a ubiquitous precursor to several commercial crankcase ashless dispersants, including succinimides, succinates, succinate esters amides, and triazoles (U.S. Pat. Nos. 3,272,746; 4,234,435; 3,219,666; 4,873,009; 4,908,145; and 5,080, 815). The PBSA intermediate is derived from the reaction of maleic anhydride and polybutene via a thermal process and/or a chlorination process as described in U.S. Pat. Nos. 3,361,673 and 3,172,892.

It is desirable to produce oil-soluble lubricant oil and fuel additives, such as crankcase dispersants, with improved sludge protection and dispersancy, enhanced viscometric characteristics, and improved seal compatibility.

SUMMARY OF THE INVENTION

This invention concerns the utilization of polymeric compounds generated from Mannich base macromonomers as lubricant oil and fuel additives or intermediates to such additives. Requisite macromonomers are generated via Mannich reaction of alkyl phenols and unsaturated amines. As used herein and in the claim, the term "macromonomer" refers to relatively complex monomers formed from more than one chemical moiety, and which monomers are capable of polymerizing and in some instances, forming cross-linked polymers. Homopolymers of the Mannich base macromonomers or copolymers with activated unsaturated monomers, such as maleic anhydride, are of particular interest as crankcase dispersants. For example, functionalization of Mannich base macromonomer/maleic anhydride copolymers with amines affords effective crankcase dispersants. Such polymeric dispersants are designed to impart superior sludge protection and improved viscometrics to lubricant oils.

Thus, the polymeric additives of the present invention can permit lower dispersant treat rates as well as lower levels of viscosity index improving agents.

The present invention includes a macromonomer, used to produce polymeric dispersants of the present invention, with the general formula:

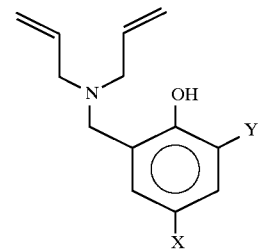

wherein X is a carbon-containing substituent of sufficient size so as to render a polymer made therefrom oil soluble. Typically, the X moiety is a carbon-containing substituent of at least 30 carbons; it may be a polymer of monomers, such as monomers having from 2 to 6 carbons. In a preferred embodiment, the X substituent is polybutene (PB), such as polyisobutene (PIB). The Y group may be selected from hydrogen or a diallyl aminomethyl group.

The present invention also includes a method of preparing polymers from the macromonomer of the present invention, which method includes reacting a diallylamine with a substituted phenol (containing an oil-solubility-imparting substituent), followed by reacting the resultant macromonomer so as to form a homopolymer. Alternatively, a macromonomer may be copolymerized with maleic anhydride, so as to form a copolymer. The resultant copolymer may be further reacted at the anhydride site as described herein.

The present invention includes a composition of matter comprising a polymer of the general chemical structure:

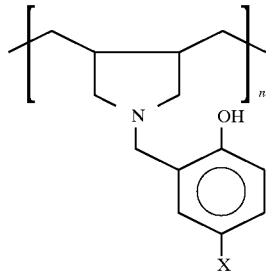

wherein n is 1 or greater, and wherein X is a carbon-containing substituent of sufficient size so as to render the polymer oil soluble. Typically, the X moiety is a carbon-containing substituent of at least 30 carbons; it may be a polymer of monomers, such as monomers having from 2 to 6 carbons. In a preferred embodiment, the X substituent is polybutene (PB).

In alternative embodiments, the present invention includes a composition of matter comprising a polymer of the general chemical structure:

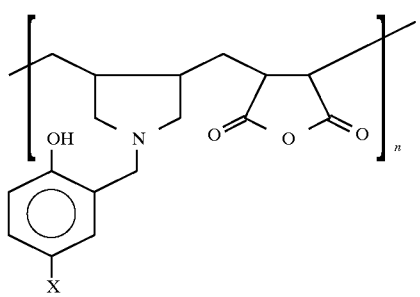

wherein n is 1 or greater, and wherein X is a carbon-containing substituent of sufficient size so as to render the polymer oil soluble while retaining a lubricating viscosity and providing improved sludge protection and dispersancy and improved seal compatibility. Typically the X moiety is a carbon-containing substituent of at east 30 carbons; it may be a polymer of monomers, such as monomers having from 2 to 6 carbons. In a preferred embodiment, the X substituent is polybutene (PB). This is produced by reacting the macromonomer and maleic anhydride, referred to herein as MM/MAN.

In alternative embodiments, the present invention includes a composition of matter comprising a polymer similar to those described above but incorporating a polyamine structure by reacting a polyalkylene polyamine with the MM/MAN copolymer, so as to have the general chemical structure such as:

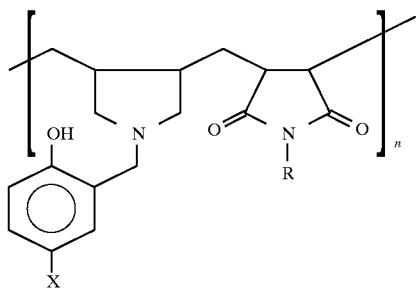

wherein n is 1 or greater, wherein X is a carbon-containing substituent of sufficient size so as to render said polymer oil soluble, and wherein R is an alkyl group containing from about 0 to 10 amine nitrogen atoms and from about 2 to 40 carbons. Typically, the X moiety is a carbon-containing substituent of at least 30 carbons; it may be a polymer of monomers, such as monomers having from 2 to 6 carbons. As an alternative to the polyamine moieties, one may derive the R group by reaction of the MM/MAN copolymer with at least one composition selected from the group consisting of amines, polyamines, alcohols, polyols and metal reactants.

In a preferred embodiment, the X substituent is polybutene (PB). It is also preferred that the polyamine structure, e.g., a tetraethylene pentamine moiety, is crosslinked to another such polymer of the present invention, so as to arrive at a structure such as:

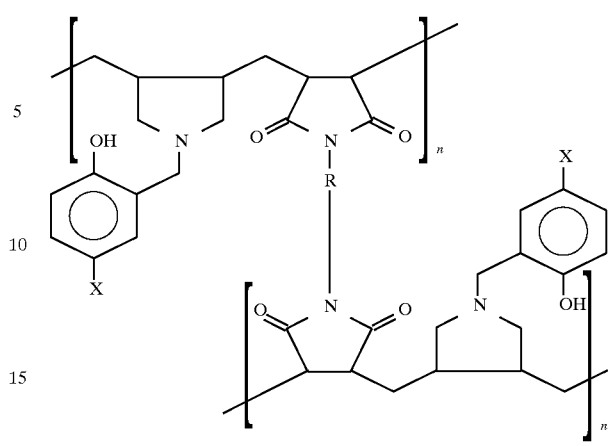

wherein n is 1 or greater, wherein X is a carbon-containing substituent of sufficient size so as to render said polymer oil soluble (again, preferably polybutene (PB)) and wherein R is an alkyl group containing from about 0 to 10 amine nitrogen atoms and from about 2 to 40 carbons. Typically, the X moiety is a carbon-containing substituent of at least 30 carbons; it may be a polymer of monomers, such as monomers having from 2 to 6 carbons. The R group may be selected so as to provide about 6 to 12 atoms between the crosslinked moieties, and may be a polyamine moiety.

In another alternative embodiment, the present invention includes a composition of matter comprising a polymer similar to those described above but prepared by reacting the MM/MAN copolymer with an alcohol or polyol moiety, e.g., such as butanol, so as to produce a polymer of the general chemical structure:

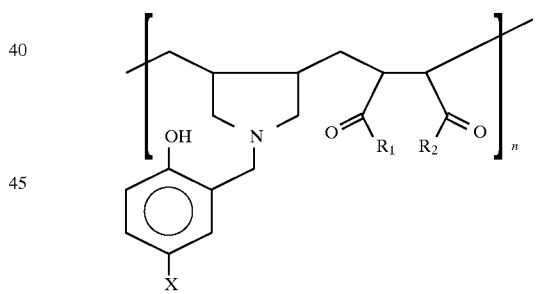

wherein n is 1 or greater, wherein X is a carbon-containing substituent of sufficient size so as to render said polymer oil soluble, and wherein $R_1$ and $R_2$ are selected from the group consisting of a hydroxyl group and groups of a carbon chain of at least 2 carbons, with at most only one of $R_1$ and $R_2$ being a hydroxyl group depending upon the stoichiometry of the addition of the alcohol or polyol moiety. That is, the greater the amount of the reacting species, such as an alcohol, the greater the degree of esterification in cleaving the maleic anhydride ring.

An example of a reaction by which compounds of the present invention may be made includes the production of a polybutene-phenol/diallylamine Mannich macromonomer homopolymer as follows:

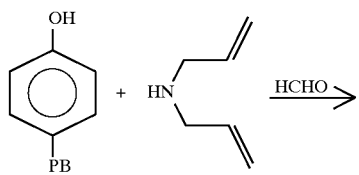
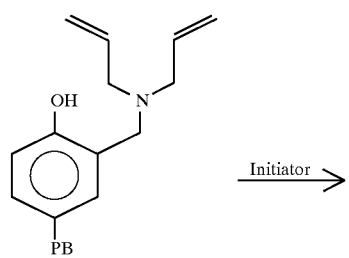
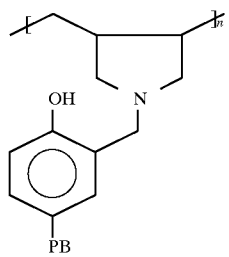

Another example of a reaction by which compounds of the present invention may be made include the production of a polybutene-phenol/diallylamine/maleic anhydride macromonomer and subsequent reaction with a polyamine such as tetraethylenepentamine as follows:

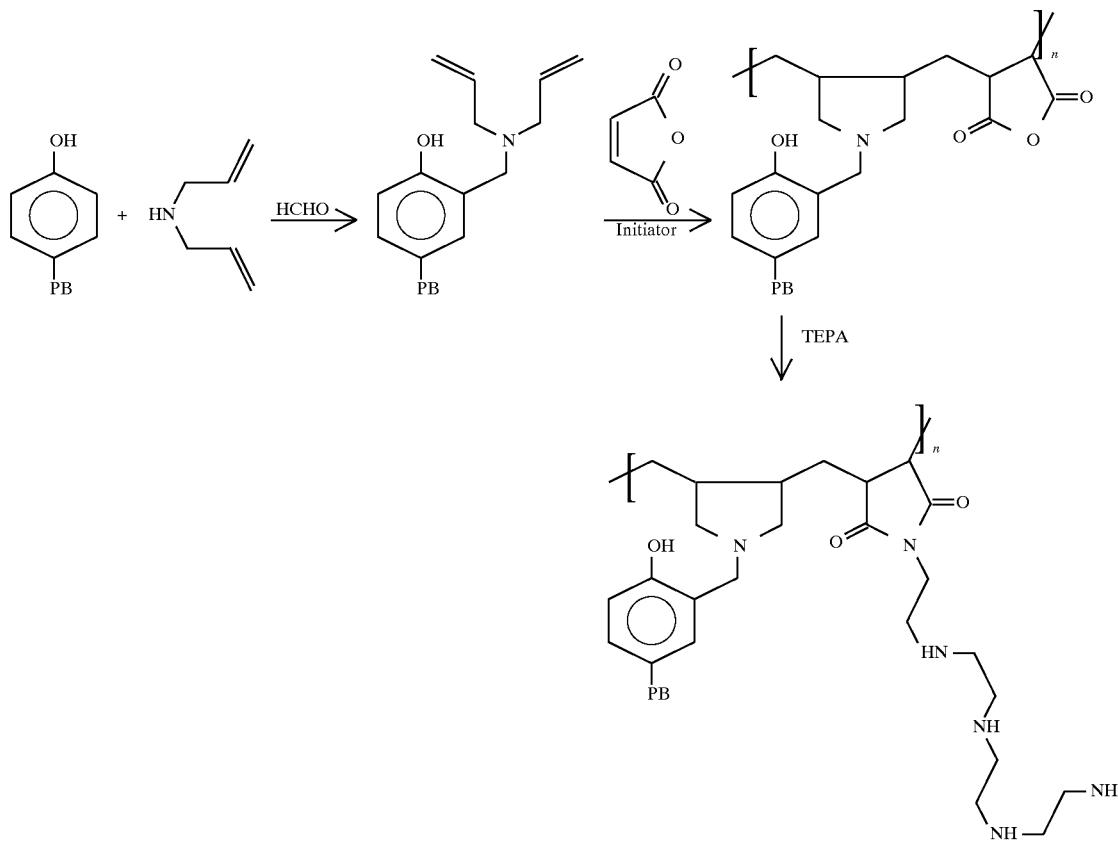

In an alternative embodiment, the present invention includes a composition of matter comprising a polymer of the general chemical structure:

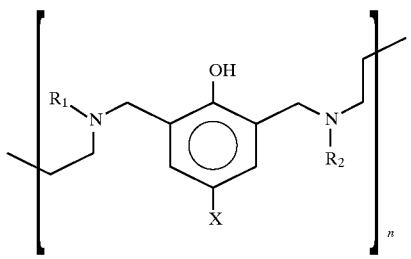

wherein n is 1 or greater, wherein X is a carbon-containing substituent of sufficient size so as to render said polymer oil soluble (again, preferably polybutene (PB)) and wherein $R_1$ and $R_2$ are each independently hydrogen and/or a carbon chain. Typically, the X moiety is a carbon-containing substituent of at least 30 carbons; it may be a polymer of monomers, such as monomers having from 2 to 6 carbons.

An example of a reaction by which compounds of the present invention may be made includes the production of a polybutene-phenol/unsaturated amine Mannich macromonomer to form a polymeric additive (either homo- or co-polymer), as follows:

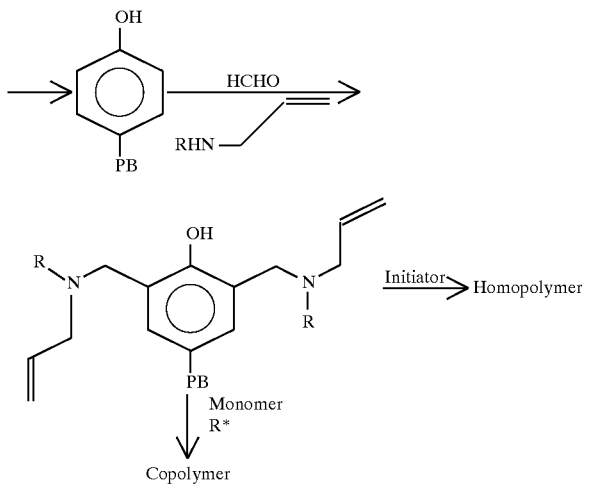

As may be appreciated from earlier examples, one may incorporate another monomer, such as a maleic anhydride monomer, to produce a copolymer through this synthetic scheme.

Additives comprising a composition of matter in accordance with the present invention may be post-treated, (i.e. reacted) with various post-treating agents such as are referenced in U.S. Pat. Nos. 4,234,435 and 5,137,980. The additives can be contacted with one or more post-treating agents selected from the group consisting of inorganic or organic phosphorus compounds, inorganic or organic sulfur compounds, boron compounds, and mono- or polycarboxylic acid derivatives thereof. Preferred post-treated dispersants of this invention are those which have been borated by reaction with a suitable boron-containing material, such as boric acid or other boron acids, boron oxide, boron trihalides, ammonium borate, super-borated ashless dispersants, etc. In general, the borated ashless dispersants will contain from about 0.01 to about 1% by weight of boron and preferably from about 0.0.5 to about 0.5 weight % of boron based on the weight of the active dispersant (i.e., omitting from consideration the weight of any diluent or unreacted components that may be present in the dispersant.)

The present invention also includes an oil of lubricating viscosity containing an additive comprising a composition of matter in accordance with the present invention. The present invention also includes a method of improving the dispersancy, sludge protection and viscometry characteristics of an oil of lubricating viscosity, the method comprising adding to the oil an effective amount of an additive comprising a composition of matter in accordance with the present invention.

The present invention also includes a hydrocarbon fuel containing an additive comprising a composition of matter in accordance with the present invention. The present invention also includes a method of dispersing contaminants in a hydrocarbon fuel, the method comprising adding to the fuel an effective amount of an additive comprising a composition of matter in accordance with the present invention.

DETAILED DESCRIPTION OF THE PREFERRED EMBODIMENTS

In accordance with the foregoing summary of the invention, the following present several detailed descriptions of the preferred embodiments of the present invention in the form of working examples, which are presently considered to be the best mode of the invention.

Preparation of Mannich Macromonomers

The following examples are representative preparations of the Mannich macromonomers utilized in this invention. The high molecular weight alkyl phenols used in these preparations may be prepared via established literature procedures.

The Mannich macromonomers were characterized by nuclear magnetic resonance (NMR) and infrared spectroscopy. The benzylic substituent of the Mannich macromonomers is characterized by a proton NMR resonance around 3.2 parts per million (ppm). In addition to the benzylic resonance, the diallylamine-derived Mannich macromonomers exhibit proton NMR resonances around 3.1, 5.2 and 5.8 ppm, which are characteristic of the allyl substituent. The Mannich macromonomers are characterized by infrared spectroscopy absorbances around 1600, 1650 and 1700 wavenumbers.

EXAMPLE 1

A 0.5 L flask equipped with overhead stirrer, Dean Stark trap, nitrogen inlet and outlet and thermometer, was charged with 73.64 g of polybutene phenol (Mn 1705, Activity 46.3 wt %) and 1.94 g of diallylamine. The mixture was heated to 85°–87° C. and stirred under a continuous nitrogen purge. A 37 wt. % solution of formaldehyde (2.59 g) was added to the above mixture over about 20 minutes. The resulting mixture was heated an additional 40 minutes at 85°–90° C. The reaction temperature was raised to, and maintained at 155° C. for 2 hours while water was removed. Volatiles and residual water were removed in vacuo to yield about 74.8 g. of a liquid macromonomer product.

EXAMPLE 2

A 1 L flask equipped with overhead stirrer, Dean Stark trap, nitrogen inlet and outlet and thermometer was charged with 150.0 g of polybutene phenol (Mn 1705, Activity 46.3 wt. %), 23.09 g of process oil, and 3.86 g of diallylamine. The mixture was heated to 85°–87° C. and stirred under a continuous nitrogen purge. A 37 wt. % solution of formaldehyde (4.03 g) was added to the above mixture over about 20 minutes. The resulting mixture was heated an additional 45 minutes at 85°–90° C. The reaction temperature raised to, and maintained at, 115° C. for 2 hours while water was removed. The reaction temperature was then raised to 135° C., and volatiles and residual water were removed in vacuo to yield 176.23 g of macromonomer product.

EXAMPLE 3

A 1 L flask equipped with overhead stirrer, Dean Stark trap, nitrogen inlet and outlet and thermometer was charged with 52.5 g of polybutene phenol (Mn 1000, Activity 72.6 wt. %), 42.35 g of process oil, and 1.68 g of diallylamine. The mixture was heated to about 85°–87° C. and stirred under a continuous nitrogen purge. A 37 wt. % solution of formaldehyde (3.87 g) was added to the above mixture over about 20 minutes. The reaction temperature was then raised to 115° C., and a second portion of 37 wt. % formaldehyde (3.93 g) was added over 1 hour. Reaction temperature was raised to 135° C. for an additional 1.5 hours while water was removed. Volatiles and residual water were removed in vacuo to yield 97.53 g of macromonomer product.

EXAMPLE 4

A 4 L flask equipped with overhead stirrer, Dean Stark trap, nitrogen inlet and outlet and thermometer was charged with 1000.2 g of polybutene phenol (Mn 1477, Activity 49.62 wt. %), 251.2 g of process oil, 4.75 g of oleic acid, and 35.90 g of diallylamine. The mixture was heated to about 85°–87° C. and stirred under a continuous nitrogen purge. A 37 wt. % solution of formaldehyde (51.74 g) was added to the above mixture over about 1 hour. The reaction temperature was then raised to 105° C., and a second portion of 37 wt. % formaldehyde (16.58 g) was added over 30 minutes. The reaction temperature was raised to 130° C. for an additional 1.5 hours while water was removed. Volatiles and residual water were removed in vacuo to yield 1292.4 g of macromonomer product.

EXAMPLE 5

A 0.5 L flask equipped with overhead stirrer, Dean Stark trap, nitrogen inlet and outlet and thermometer was charged with 249.9 g of polybutene phenol (Mn 1477, Activity 49.62 wt. %), 2.4 g of oleic acid, and 16.5 g of diallylamine. The mixture was heated to about 85°–87° C. and stirred under a continuous nitrogen purge. A 37 wt. % solution of formaldehyde (17.09 g) was added to the above mixture over about 1 hour. The resulting mixture was heated an additional 1 hour at 85°–90° C. The reaction temperature then raised to and maintained at 135°–140° C. for 1.5 hours while water was removed. Volatiles and residual water were removed in vacuo to yield 97.53 g of macromonomer product.

Free Radical Polymerization of Mannich Macromonomers

The Mannich macromonomers/maleic anhydride (MM/MAN) copolymers of the present invention are characterized by infrared (IR) spectroscopy and acid number determinations. The MM/MAN copolymers exhibit IR carbonyl absorbances at 1860±5 and 1780±5 wavenumbers.

The following procedure was utilized to determine the acid number values for the Mannich macromonomers/maleic anhydride copolymers. A known quantity of the MM/MAN was dissolved in a 1:1 kerosene: 1-butanol mixture and titrated with sodium isopropoxide titrant. The acid number was calculated and divided by 56.1 to give an acid number in milliequivalents of KOH per gram of sample.

EXAMPLE 6

A 0.1 L flask equipped with overhead stirrer, condenser, and thermocouple under a nitrogen atmosphere was charged with 25.00 g of the Mannich macromonomer prepared in Example 1. The macromonomer was heated with stirring under nitrogen to 150° C. A solution of 1.89 g of maleic anhydride in 20 ml of xylene (previously filtered to remove hydrolysis contaminants) was added cautiously to the heated macromonomer. After heating the resulting mixture to 145° C., 0.58 g of di-tert-butyl peroxide was added via syringe over 1 hour. The reaction temperature is maintained between about 145°–147° C. during the peroxide addition. The reaction temperature is then raised over 1 hour to 155° C. and held at this temperature for 1 hour. Solvent and residual maleic anhydride were removed in vacuo. A total of 26.54 g of product having an acid number of 0.3 milliequivalents (meq) of KOH/gram was recovered.

EXAMPLE 7

A 0.25 L flask equipped with overhead stirrer, condenser, and thermocouple under a nitrogen atmosphere was charged with 60.01 g of the Mannich macromonomer prepared in Example 3. The macromonomer was heated with stirring under nitrogen to 150° C. A solution of 6.55 g of maleic anhydride in 45 ml of xylene (previously filtered to remove hydrolysis contaminants) was added slowly to the heated macromonomer. After heating the resulting mixture to 145° C., 1.52 g of di-tert-butyl peroxide was added via syringe over about 2 hours. The reaction temperature is maintained between about 145°–147° C. during the peroxide addition. The reaction temperature was then raised over 1 hour to 155° C. and held at this temperature for 1 hour. Solvent and residual maleic anhydride were removed in vacuo. A total of 62.2 g of product having an acid number of 0.5 milliequivalents (meq) of KOH/gram was recovered.

EXAMPLE 8

A 3 L flask equipped with overhead stirrer, condenser, and thermocouple under a nitrogen atmosphere was charged with 1100.4 g of the Mannich macromonomer prepared in Example 4. The macromonomer was heated with stirring under nitrogen to 145° C., and 7.97 g of di-tert-butyl peroxide was added over about 2 hours. After about 15 minutes, a solution of 62.00 g of maleic anhydride in 215 ml of xylene (previously filtered to remove hydrolysis contaminants) is added over about 1.5 hours to the heated macromonomer/peroxide reaction mixture. The reaction temperature is maintained between about 145°–147° C. during the peroxide/maleic anhydride co-feed. The reaction temperature was then raised over 1 hour to 155° C. and held at this temperature for 1 hour. Solvent and residual maleic anhydride were removed in vacuo. A total of 1131.5 g of product having an acid number of 0.22 milliequivalents (meq) of KOH/gram was recovered.

EXAMPLE 9

A 0.5 L flask equipped with overhead stirrer, condenser, and thermocouple under a nitrogen atmosphere was charged with 100.42 g of the Mannich macromonomer prepared in Example 5. The macromonomer was heated with stirring under nitrogen to 145° C., and the addition of 1.48 g of di-tert-butyl peroxide over about 2 hours was initiated. After about 15 minutes, a solution of 14.15 g of maleic anhydride in 58 ml of xylene (previously filtered to remove hydrolysis contaminants) was added over about 1.5 hours to the heated macromonomer/peroxide reaction mixture. The reaction temperature is maintained between about 145°–147° C. during the peroxide/maleic anhydride co-feed. The reaction temperature was then raised over 1 hour to 155° C. and held at this temperature for 1 hour. Solvent and residual maleic anhydride were removed in vacuo. A total of 111.41 g of product having an acid number of 0.22 milliequivalents (meq) of KOH/gram was recovered.

EXAMPLE 10

A 0.1 L flask equipped with overhead stirrer, condenser, and thermocouple under a nitrogen atmosphere was charged with 25.81 g of the Mannich macromonomer prepared in Example 2. The macromonomer was heated with stirring under nitrogen to 145° C., and 0.51 g of di-tert-butyl peroxide was added over about 1.5 hours. The reaction temperature was maintained between about 145°–147° C. during the peroxide addition. The reaction temperature was then raised over 1 hour to 155° C. and held at this temperature for 1 hour. Volatiles were removed in vacuo to yield 24.86 g macromonomer product.

EXAMPLE 11

A 0.25 L flask equipped with overhead stirrer, condenser, and thermocouple under a nitrogen atmosphere was charged with 75.2 g of the Mannich macromonomer prepared in Example 5. The macromonomer was heated with stirring under nitrogen to 95° C., and an initial 52 mg portion of 2, 2'-azobis (isobutyronitrile) (AIBN) was added. After 1 hour, a second 54.0 mg portion of AIBN was added. After an additional hour, a third AIBN portion, 68 mg, was added. A final portion of AIBN, 53 mg, was added after an additional hour. The reaction temperature was maintained between about 92°–95° C. for an additional hour. The reaction temperature was then raised to 115° C. and held at this temperature for 3 hours. Volatiles and were removed in vacuo to yield 74.95 g macromonomer product.

Functionalization of Mannich Macromonomers/
Maleic Anhydride Copolymers

Mannich Macromonomer/Maleic Anhydride/Amine products are characterized by infrared spectroscopy. These products exhibit infrared carbonyl absorbances at 1770±5 and 1700±5 wavenumbers (cm$^{-1}$).

EXAMPLE 12

A 0.1 L flask equipped with overhead stirrer, Dean Stark trap, and thermometer, was charged with 18.79 g of MM/MAN copolymer (Acid #0.3 meq KOH/g), 4.26 g of process oil, and 25 ml of toluene. The mixture was heated to 110° C. with stirring under a continuous nitrogen purge. A polyethylene amine mixture comparable to tetraethylenepentamine (supplied by Dow as Ethyleneamine S1107), 0.77 g, was added to the above mixture over about 10 minutes. The resulting mixture was heated to 120° C. and toluene/water azeotroped for 1 hour. The reaction temperature then was raised to 155° C. over an additional 1 hour. Solvent and residual water were removed in vacuo to yield 23.53 g of product.

EXAMPLE 13

A 0.1 L flask equipped with overhead stirrer, Dean Stark trap, and thermometer, was charged with 30.02 g of MM/MAN copolymer (Acid #0.5 meq KOH/g), 6.62 g of process oil, and 1.45 g of a polyethylene amine mixture comparable to tetraethylenepentamine (supplied by Dow as Ethyleneamine S1107). The mixture with stirring and a continuous nitrogen purge was heated to, and held at, 120° C. for 1 hour. The reaction temperature was then raised to 155° C. over an additional 1 hour while water was removed. Volatiles and residual water were removed in vacuo to yield 37.81 g of product.

EXAMPLE 14

A 3 L flask equipped with overhead stirrer, Dean Stark trap, and thermometer, was charged with 1000.75 g of MM/MAN copolymer (Acid #0.22 meq KOH/g), and 122.97 g of process oil. The mixture was heated to 115° C. with stirring under a continuous nitrogen purge. A polyethylene amine mixture comparable to tetraethylenepentamine (supplied by Dow as Ethyleneamine S1107), 30.85 g, was added to the above mixture over about 50 minutes. The resulting mixture was heated to, and maintained at, 155° C. for 3 hours while water was removed. Volatiles and residual water were removed in vacuo to yield 1232.8 g of product.

EXAMPLE 15

A 0.5 L flask equipped with overhead stirrer, Dean Stark trap, and thermometer, was charged with 69.76 g of MM/MAN copolymer (Acid #0.22 meq KOH/g), and 31.95 g of process oil. The mixture was heated to 115° C. with stirring under a continuous nitrogen purge. A polyethylene amine mixture comparable to tetraethylenepentamine (supplied by Dow as Ethyleneamine S1107), 1.81 g, was added to the above mixture over about 1 hour. The resulting mixture was heated to, and maintained at, 155° C. for 3 hours while water was removed. The resulting mixture was further diluted with 6.89 g of process oil. Volatiles and residual water were removed in vacuo to yield 110 g of product.

The following table exemplifies additional analogues utilizing the basic procedure detailed in Example 15. The following abbreviations are used in this table: MM/MAN denotes Mannich macromonomer, PO #5 refers to a diluent process oil, meq/g denotes milliequivalents per gram, and g denotes grams.

Mannich Macromonomers/Maleic Anhydride Copolymers
Amine Functionalization

| Example # | MM/MAN (g) | MM/MAN Acid # (meq/g) | PO #5 (g) | Amine (g) | Yield (g) |
|---|---|---|---|---|---|
| 16 | 23.1 | 0.32 | 5.08 | 1.06 | 29.81 |
| 17 | 21.0 | 0.30 | 4.75 | 0.78 | 26.1 |
| 18 | 51.6 | 0.33 | 9.53 | 2.52 | 63.1 |
| 19 | 50.1 | 0.33 | 8.64 | 2.04 | 60.2 |
| 20 | 921.3 | 0.26 | 126.1 | 29.56 | 1070.6 |

Additional Examples (Performance Evaluations)

The amine functionalized polymeric additives of this invention show improved dispersancy performance in the Spot Dispersancy Test over a commercial Mannich dispersant (HiTEC® 7049). The Spot Dispersancy Test affords a measure of an additives' ability to disperse sludge. In the Spot Dispersancy Test, a dispersant candidate is mixed with an amount of Sequence VE sludge oil and is incubated at 300° F. for 16 hours. The resulting mixture (3–10 drops) is dropped onto a standard white blotter paper producing a sludge oil spot. After 24 hours, the diameter of the sludge and the oil rings are measured. As dispersancy is the ability of an oil to keep sludge in suspension, dispersancy in the Spot Dispersancy Test is reflected by the difference in diameters of the sludge and oil rings. High dispersancy is reflected by the sludge ring being nearly as wide as the oil ring. A rating (SDT Rating) is given by the multiplying the quotient of the sludge ring and the oil ring diameters by 100. A high numerical rating is indicative of good dispersancy. Table 2 depicts the Spot Dispersancy Test performance of several additives of the present invention. Commercial dispersant 1 refers to the commercial Mannich dispersant and Commercial dispersant 2 refers to the commercial product, HiTEC® 646, succinimide dispersant.

Mannich Macromonomers/Maleic Anhydride/Amine
Spot Dispersant Test Results
Table 2

| Sample | SDT Rating |
| --- | --- |
| Commercial Mannich | 72.5 |
| Example 12 | 76.9 |
| Example 13 | 62.7 |
| Example 14 | 77.6 |
| Example 19 | 73.8 |
| Example 20 | 70.7 |

Additives of this invention, a commercial Mannich dispersant (HiTEC® 7049 dispersant), and a commercial succinimide dispersant (HiTEC® 646 dispersant) were blended into a motor oil formulation utilizing metal-containing sulfonates, zinc dithiophosphate wear inhibitors, sulfur containing antioxidants, a pour point depressant, and a viscosity index improver supplied by Shell Chemical Company (Shellvis® 300). Additives of the invention and the commercial Mannich dispersant were of nearly equal activities (around 40 wt. %), while the commercial succinimide dispersant was at a higher equal activity of 65 wt. %. The additives of the present invention impart significantly higher 100° C. viscosities to motor oil formulations than the two commercial dispersants by virtue of the advantageous polymeric nature of the additives of this invention. The following table details the advantageous 100° C. viscometrics of motor oils formulated with the polymeric additives of this invention.

Mannich Macromonomers/Maleic Anhydride/Amine
VISCOMETRICS (100° C. & -25° C. COLD CRANK)
Table 3

| SAMPLE | DISPERSANT Wt. % | 100° C. VISCOSITY (cSt) | -25° C. COLD CRANK (cP) |
| --- | --- | --- | --- |
| Commercial 1 | 7.00 | 10.59 | 3300 |
| Commercial 2 | 7.00 | 10.33 | 3920 |
| Example 12 | 7.00 | 11.08 | 3160 |
| Example 15 | 7.00 | 14.28 | 3200 |
| Example 16 | 7.00 | 11.66 | 3270 |

More importantly, the dispersants of this invention impart significant 100° C. viscosity lift to finished oils with no adverse effects on low temperature viscometrics. The dispersants of this invention were blended into motor oil formulations utilizing metal-containing sulfonates, zinc dithiophosphate wear inhibitors, sulfur containing antioxidants, a pour point depressant, and a viscosity index improver supplied by Shell Chemical Company (Shellvis 300). Blends with 7 wt. % dispersant and 7 wt. % viscosity index improver easily meet the 5W–30 low temperature -25° C. cold crank simulator specification of less than 3500 centipoise (cP). The excellent -25° C. cold crank simulator performance of oils formulated with dispersants of this invention are depicted in Table 3.

The additives of this invention also contribute significant viscosity index credit to finished oils, reducing the amount of conventional viscosity index improver required to achieve a desired viscosity target. Reducing the amount of viscosity index improver in a motor oil can thus offer both cost and engine cleanliness advantages. Table 4 details viscosity index credit advantages exhibited by several polymeric dispersants of this invention. For oils formulated as described above, 7 wt. % of the Commercial dispersant 1 or Commercial dispersant 2 required 7 wt. % of the viscosity index improver (Shellvis® 300) to meet a viscosity target of 10.3 to 10.6 cSt. On the other hand, with the polymeric dispersants additives of the invention requires lower amounts of this same viscosity index improver to meet the 100° C. viscosity target.

Mannich Macromonomers/Maleic Anhydride/Amine
VISCOSITY INDEX CREDIT
Table 4

| SAMPLE | DISPERSANT Wt. % | VII Wt. % | 100° C. VISCOSITY (cSt) | -25° C. COLD CRANK (cP) |
| --- | --- | --- | --- | --- |
| Commercial 1 | 7.00 | 7.00 | 10.59 | 3300 |
| Commercial 2 | 7.00 | 7.00 | 10.33 | 3920 |
| Example 14 | 7.00 | 5.10 | 9.88 | 3340 |
| Example 15 | 7.00 | 5.00 | 10.16 | 3340 |
| Example 16 | 7.0& | 7.00 | 14.28 | 1580 |
| Example 16 | 7.00 | 4.50 | 12.29 | 3280 |
| Example 17 | 7.00 | 3.00 | 10.99 | 3300 |

The ability of the dispersants of this invention to resist oxidative thickening and to disperse engine sludge was measured in a oxidative thickening bench test where the dispersant formulated in a motor oil is oxidatively stressed in the presence of severely used oil from a Sequence VE engine test. This used oil is viscous and serves as a source of engine sludge. The oil formulated with the test dispersant is heated at 320° F. with the introduction of air throughout the test duration of 168 hours. Sample taken at regular intervals throughout the test are monitored for viscosity increase and spot dispersancy. Lower viscosity increases indicate a better resistance to oxidative thickening. Ten drops of the stressed oil are dropped onto Whatman No. 3031915 blotter paper for spot dispersancy evaluation. After 16 hours, the diameters of the inner ring of dispersancy and the outer oil ring are measured. The percent spot dispersancy is the diameter of the inner ring, divided by the diameter of the outer ring, times 100. Spot dispersancy values above 70% are indicative of good dispersancy. Without dispersant, values of 36 to 38% are obtained. This test procedure is described in Example 1 of U.S. Pat. No. 4,908,145.

The commercial dispersant 1 blended into a motor oil formulation utilizing metal-containing sulfonates, zinc dithiophosphate wear inhibitors, sulfur containing antioxidants, a pour point depressant, and a viscosity index improver supplied by Shell Chemical Company (Shellvis 300) at 7 wt. % gave a 165.7 percent viscosity increase and a spot dispersancy of 78.9% in the oil thickening bench test. Commercial dispersants exhibit excellent properties in the Sequence VE test and the Sequence IIIE test. The dispersant of Example 14 blended at 7 wt. % into the same formulation as above, gave an improved result of only a 49.49 percent viscosity increase and a spot dispersancy of 79.4%. These results demonstrate that the dispersants of this invention achieve both excellent oxidative stability and dispersancy. These results are depicted graphically in Table 5.

Mannich Macromonomers/Maleic Anhydride/Amine
OXIDATIVE STABILITY & DISPERSANCY (OIL THICKENING TEST)
Table 5

| SAMPLE | VII (Wt. %) | VISCOSITY INCREASE @ 168 HOURS | SDT RATING |
|---|---|---|---|
| Commercial 1 | 7.00 | 165.7 | 78.9 |
| Example 14 | 5.10 | 49.49 | 79.4 |

In view of the foregoing disclosure, it will be within the ability of one skilled in the art to make modifications to the present invention, such as through the substitution of equivalent materials and/or process steps in order to practice the invention without departing from its spirit as reflected in the appended claims.

What is claimed is:

1. A composition of matter comprising a polymer (C), said polymer (C) of the chemical structure:

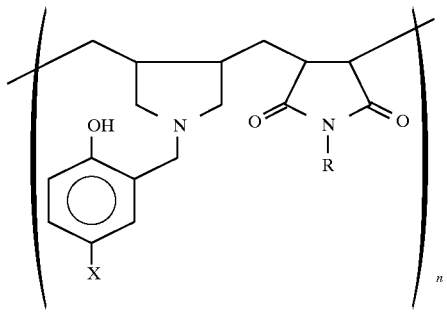

wherein n is 1 or greater, wherein X is a polyolefin of olefin monomers, said olefin monomers having from 2 to 6 carbons, of sufficient size so as to render said polymer (C) oil soluble, and wherein R is selected from the group consisting of basic salts of aminoguanidine, amines, polyamines, alcohols, and polyols; wherein said amines, polyamines, alcohols, and polyols comprise a carbon chain containing from about 0 to 10 amine nitrogen atoms and from about 2 to 40 carbon atoms.

2. A composition of matter according to claim 1 wherein X has at least 30 carbons.

3. A composition of mater according to claim 1 wherein X is polybutene.

4. A composition of matter according to claim 1 wherein said R group has from about 6 to about 12 carbon atoms.

5. A composition of matter according to claim 1 wherein said R group is derived from a polyalkylene polyamine containing 3 to 6 amino groups per molecule.

6. A composition of mater according to claim 1 wherein said R group is derived from a basic salt of aminoguanidine.

7. The composition of matter according to claim 5 which has been contacted with one or more post-treating agents selected from the group consisting of inorganic or organic phosphorus compounds, inorganic or organic sulfur compounds, boron compounds, and mono- or poly-carboxylic acids.

8. The composition of matter according to claim 7 wherein the post-treating agent is an inorganic phosphorus acid or anhydride, and inorganic sulfurous acid, boric acid, an unsaturated dicarboxylic acid, or a mixture of these.

9. An oil of lubricating viscosity comprising said oil and an additive comprising a composition of matter according to claim 1.

10. A hydrocarbon fuel comprising said fuel and an additive comprising a composition of matter according to claim 1.

11. A method of dispersing contaminants in an oil of lubricating viscosity, said method comprising adding to said oil an additive comprising a composition of matter according to claim 1.

12. A method of dispersing contaminants in a hydrocarbon fuel, said method comprising adding to said hydrocarbon fuel an additive comprising a composition of matter according to claim 1.

* * * * *